(12) United States Patent
Warthen

(10) Patent No.: US 6,897,984 B2
(45) Date of Patent: May 24, 2005

(54) METHOD OF CHROMAKEY RECORDING USING LUMINESCENT SCREEN

(75) Inventor: David Warthen, Orinda, CA (US)

(73) Assignee: GlobalStreams, Inc., St. Louis, MO (US)

(*) Notice: Subject to any disclaimer, the term of this patent is extended or adjusted under 35 U.S.C. 154(b) by 0 days.

(21) Appl. No.: 10/119,950

(22) Filed: Apr. 11, 2002

(65) Prior Publication Data

US 2002/0150400 A1 Oct. 17, 2002

Related U.S. Application Data

(60) Provisional application No. 60/282,903, filed on Apr. 11, 2001.

(51) Int. Cl.[7] ............................................ G06K 15/00
(52) U.S. Cl. ..................... 358/21; 382/132; 290/327.2; 358/296
(58) Field of Search ................................ 382/128, 132; 358/1.9, 2.1, 3.28, 1.18, 509, 510, 296; 290/327.2

(56) References Cited

U.S. PATENT DOCUMENTS

| | | | |
|---|---|---|---|
| 3,085,877 A | 4/1963 | Reid | 96/27 |
| 4,178,613 A | 12/1979 | Takahashi et al. | 358/183 |
| 4,196,449 A | 4/1980 | Tama et al. | 358/183 |
| 4,393,394 A | 7/1983 | McCoy | 358/22 |
| 4,396,939 A | 8/1983 | Kitahama | 358/22 |
| 4,417,791 A | 11/1983 | Erland et al. | 352/45 |
| 4,629,298 A | 12/1986 | Trumbull et al. | 353/30 |
| 4,916,316 A * | 4/1990 | Umemoto | 250/327.2 |
| 5,036,208 A | 7/1991 | Murata et al. | 250/487.1 |
| 5,091,970 A * | 2/1992 | Takeo | 382/48 |
| 5,517,034 A * | 5/1996 | Neyens | 250/484.4 |
| 5,629,125 A * | 5/1997 | Leblans | 430/139 |
| 5,972,440 A | 10/1999 | Erland | 428/33 |

* cited by examiner

Primary Examiner—Jerome Grant, II
(74) Attorney, Agent, or Firm—Thompson Coburn LLP

(57) ABSTRACT

A method of chromakey recording, which includes providing, in a scene, a chromakey material which is capable of continued luminance without activating light. The chromakey material is activated and the scene is recorded without activating light while the chromakey material is luminescing. The chromakey material may be an electroluminescent material that is activated by applying electrical energy to the chromakey material. The chromakey material may also be a phosphorescent material, which is activated by applying light to the phosphorescent material. The light is removed from the phosphorescent material during recording.

7 Claims, 1 Drawing Sheet

METHOD OF CHROMAKEY RECORDING USING LUMINESCENT SCREEN

CROSS REFERENCE

This application claims the benefit of Provisional Application No. 60/282,903 filed Apr. 11, 2001 under 35 U.S.C. §119(e).

BACKGROUND AND SUMMARY OF THE INVENTION

The present invention relates generally to blue/green screens for use in chromakey applications and, more specifically, to an improved blue/green screen used in chromakey recording.

Blue and green screens are used in video and film production for chromakey application. Basically, people and objects are placed in front of a blue or green screen that reflects monochromatic light. The camera picks up this monochromatic light and image-processing equipment (that is, hardware and software) then substitutes different images where the blue or green color (i.e., the chromakey) appears.

In this way, people and objects can be placed in virtual settings in the resulting video.

Another application is that foreground objects may also reflect the same color and hence be chromakeyed. This is difficult as it is very hard to get the object illuminated in an even enough manner to chromakey.

Another chromakey device is a product called Chromatte™ fabric, formerly HoloSet. Chromatte is a highly reflected fabric having glass beads therein that is used in conjunction with a circle of monochromatic lights around the camera lens of pure blue or green light to give the blue or green screen effect. There is a practical problem using Chromatte fabric with cameras having teleprompters mounted thereon because of the bright lights.

Another method for chromakey production describes the use of phosphorescent material, as shown in U.S. Pat. No. 4,417,791 to Erland et al. A red phosphorescent material is used as a chromakey, which is exposed to visible light, while blue and green phosphorescent material are used as chromakeys and are activated by being exposed to ultraviolet radiation or light. Phosphorescent material is exposed to the light source during the different recording or photographic steps. Filters are required to eliminate and distinguish between the illuminating source and the illumination produced by the chromakey. The use of multiple light sources limits the applications in which this chromakey system may be used. It requires additional sources of light, which may not be available or undesirable to be activated during the recording of a scene.

In an attempt to address some of these problems, Erland in U.S. Pat. No. 5,972,440 uses daylight/fluorescent as a chromakey matte. Though eliminating the requirement for a special lighting, fluorescents require continuous exposure to a source of light in order to radiate light. Thus, the daylight/fluorescent is not desirable in low light situations.

An early use of fluorescent material and phosphorescent material to create special effects in films is described in U.S. Pat. No. 3,085,877. By using visible light, ultraviolet light or infrared radiation, the whole scene or selective portions of the scene coated with the luminescent category of materials were illuminated. A method of double exposure and a method of selectively turning the illumination source on and off are described to create the desired effect. The after glow effect of phosphorescent material is recognized but not used in a color key system.

The present invention is a method of chromakey recording, which includes providing, in a scene, a chromakey material which is capable of continued luminance without activating light. The chromakey material is activated and the scene is recorded without activating light while the chromakey material is luminescing. The chromakey material may be an electroluminescent material that is activated by applying electrical energy to the chromakey material. The chromakey material may also be a phosphorescent material, which is activated by applying light to the phosphorescent material. The light is removed from the phosphorescent material during recording.

These and other aspects of the present invention will become apparent from the following detailed description of the invention, when considered in conjunction with accompanying drawings.

DETAILED DESCRIPTION OF THE PREFERRED EMBODIMENTS

Figure 1:
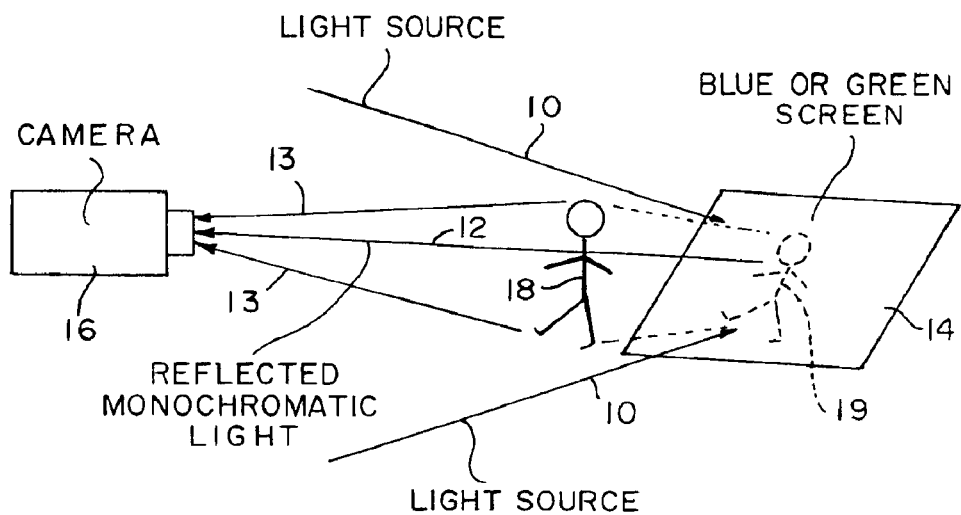
FIG. 1 is a schematic of a chromakey process of the prior art.

An example of the prior art is illustrated in FIG. 1. Light rays 10 from a light force are reflected as monochromatic light stream 12 off of screen 14 to a camera 16. The subject 18 is in front of the screen 14 reflects a light stream 13 to the camera 16 and will produce a shadow 19 on the blue screen on the screen 14.

Figure 2:
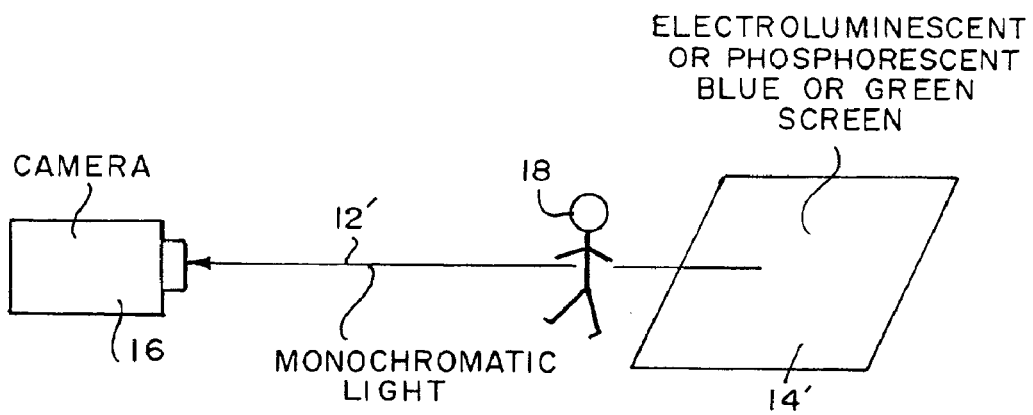
FIG. 2 is a schematic of a chromakey process according to the principles of the present invention.

The present invention, as illustrated in FIG. 2, does not use reflective light. Those elements which have the same purpose or function in FIG. 2 to those of FIG. 1 have the same numbers. The screen 14' is a luminescent screen. It may be an electroluminescent screen or a phosphorescent screen. It is made of luminescent material. Thus, the light source begins with the screen 14' and is not reflected light. The monochromatic light 12' from the screen 14' is received by the camera 16. This is independent of any external light source 10. Thus, the screen 14' itself serves as the chromakey light source. The luminous material generates a pure colored light that can be used as the chromakey. The luminescent material may be applied to plastic or fabric or other materials to form the screen. The subject 18' may still be illuminated by conventional lighting 10 (not shown for sake of clarity), but this lighting is not reflected off of the screen to generate the chromakey.

With electroluminescent material, the light source of the screen 14' may be a single color or, alternatively, may be selectable color monochromatic light. For example, the screen can either be blue or green depending on the selection. Also, portions of the screen may be blue and other portions green. This offers a double chromakey effect. Also, the electroluminescent material may be selectively activated as a chromakey or deactivated.

Electroluminescent materials are available from a variety of companies, including Elux Lighting Systems of Camarillo, Calif. Selectable electroluminescent materials are available from Visson Israel Ltd. of Romat Gen, Israel.

A phosphorescent material generates a pure colored light that can be used as a chromakey. It does not require an electrical source and, thus, can be incorporated into a screen with a wider range of materials. This can include plastics, fabrics, paints and glass. With the use of phosphorescent material, which is capable of continued luminance without an activating light, the recording of the scene with the activated chromakey material is capable without the activating light. This allows low light scenes to be recorded using the chromakey material. The phosphorescent material is charged-up with a normal, high intensity light source before recording the scene. It will keep generating the monochromatic light when the lights are lowered while actually recording the scene.

Phosphorescent materials in various colors are available from Jameson Technologies in Hereford, England, and are typically used for "glow-in-the-dark" applications.

Although electroluminescent and phosphorescent materials are preferred, they may be used by themselves or together with fluorescent materials. This will allow a very bright chromakey material in high light circumstances while allowing a less bright chromakey material in lower light circumstances as the light changes throughout the scene.

The luminescent material can be applied to inanimate objects, for example, chairs and furniture or other objects, in the scene, as well as people or other animate objects. It can be used such that they can be chromakeyed. It may also be used to key all of the foreground objects as a reverse screen.

Although the present invention has been described and illustrated in detail, it is to be clearly understood that this is done by way of illustration and example only and is not to be taken by way of limitation. The spirit and scope of the present invention are to be limited only by the terms of the appended claims.

What is claimed:

1. A method of chromakey recording a scene, the method comprising:

providing a camera having a field of view;

providing a scene disposed within the camera's field of view;

providing an electroluminescent material within the scene;

using the electroluminescent material as a chromakey light source;

recording the scene with the camera while the electroluminescent material is being used as the chromakey light source; and selectively activating and deactivating the electroluminescent material during recording; and wherein the using step comprises activating the electroluminescent material by applying electrical energy to the electroluminescent material.

2. The method of claim 1 wherein the scene includes at least one inanimate object, and wherein the electroluminescent material providing step comprises providing an electroluminescent material that is attached to at least one inanimate object.

3. The method of claim 1 wherein the scene includes at least one animate object, and wherein the electroluminescent material providing step comprises providing an electroluminescent material that is attached to at least one animate object.

4. The method of claim 1 wherein the electroluminescent material providing step comprises providing an electroluminescent screen, wherein at least one object within the scene is disposed within the camera's field of view between the camera and the electroluminescent screen.

5. The method of claim 4 wherein the electroluminescent screen providing step comprises providing a single color electroluminescent screen.

6. The method of claim 4 wherein the electroluminescent screen providing step comprises providing a selectable color monochromatic electroluminescent screen.

7. The method of claim 1 wherein the recording step comprises recording the scene on one of film, video tape or digital memory.

* * * * *